United States Patent
Karmaker et al.

(10) Patent No.: US 11,184,039 B1
(45) Date of Patent: Nov. 23, 2021

(54) METHOD OF COMBINING LTE-UHB+LAA+SUB6-5G LNA PORTS

(71) Applicant: QUALCOMM Incorporated, San Diego, CA (US)

(72) Inventors: Rahul Karmaker, San Diego, CA (US); Francesco Gatta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/882,313

(22) Filed: May 22, 2020

(51) Int. Cl.
   *H04B 1/00* (2006.01)
   *H04B 1/06* (2006.01)
   *H04B 1/04* (2006.01)

(52) U.S. Cl.
   CPC ........... *H04B 1/006* (2013.01); *H04B 1/0458* (2013.01); *H04B 1/0483* (2013.01)

(58) Field of Classification Search
   CPC ........ H04B 1/006; H04B 1/04; H04B 1/0458; H04B 1/0483; H04B 1/38; H04B 1/40; H04B 1/401; H04B 1/0053; H04B 1/16; H04B 1/18; H04B 1/3827; H04B 1/3833; H04B 1/406; H03F 3/213; H03F 2200/294; H03F 2200/451; H03F 3/195; H03F 2203/21109
   See application file for complete search history.

(56) References Cited

U.S. PATENT DOCUMENTS

| | | | |
|---|---|---|---|
| 6,983,132 B2 * | 1/2006 | Woo | H04B 1/406 455/103 |
| 7,885,613 B2 * | 2/2011 | Kemmochi | H04B 1/006 455/78 |
| 9,641,201 B2 * | 5/2017 | Bakalski | H04B 1/006 |
| 9,960,802 B2 * | 5/2018 | Ku | H04B 1/48 |
| 10,015,701 B2 * | 7/2018 | Zhou | H04B 1/0064 |
| 10,038,409 B2 * | 7/2018 | Nobbe | H04B 1/44 |
| 10,340,860 B1 | 7/2019 | Wang et al. | |
| 10,574,285 B2 | 2/2020 | Bai | |
| 10,840,956 B2 * | 11/2020 | Naniwa | H04B 1/38 |
| 10,873,355 B2 * | 12/2020 | Watanabe | H04B 1/18 |
| 10,886,951 B2 * | 1/2021 | Nagumo | H04B 1/0067 |
| 2013/0043946 A1 | 2/2013 | Hadjichristos et al. | |
| 2017/0294947 A1 | 10/2017 | Little et al. | |
| 2019/0214355 A1 * | 7/2019 | Nishikawa | H04B 1/40 |
| 2020/0028537 A1 | 1/2020 | Yang | |
| 2021/0067115 A1 * | 3/2021 | Karmaker | H04B 1/40 |

* cited by examiner

*Primary Examiner* — Quochien B Vuong
(74) *Attorney, Agent, or Firm* — QUALCOMM Incorporated

(57) ABSTRACT

According to certain aspects, a chip includes a first port, a first amplifier, and a first input path coupling the first port to an input of the first amplifier. The chip also includes a second port, a second amplifier, and a second input path coupling the second port to an input of the second amplifier. The chip further includes a switchable path coupled between the first input path and the second input path.

30 Claims, 17 Drawing Sheets

METHOD OF COMBINING LTE-UHB+LAA+SUB6-5G LNA PORTS

BACKGROUND

Field

Aspects of the present disclosure relate generally to wireless devices, and, more particularly, to reducing routing in a wireless device.

Background

A wireless may include multiple routes for routing radio frequency (RF) signals between a RF front-end module and a chip (e.g., a transceiver chip) in the wireless device. The routes may include metal lines on a substrate (e.g., a printed circuit board (PCB)) coupling the RF front-end module to ports on the chip.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a chip. The chip includes a first port, a first amplifier, and a first input path coupling the first port to an input of the first amplifier. The chip also includes a second port, a second amplifier, and a second input path coupling the second port to an input of the second amplifier. The chip further includes a switchable path coupled between the first input path and the second input path.

A second aspect relates to an apparatus. The apparatus includes a chip, a front-end radio frequency (RF) module, and a substrate. The chip includes a first port, a first amplifier, and a first input path coupling the first port to an input of the first amplifier. The chip also includes a second port, a second amplifier, and a second input path coupling the second port to an input of the second amplifier. The chip further includes a switchable path coupled between the first input path and the second input path. The apparatus also includes a route on the substrate coupling the front-end RF module to the first port.

A third aspect relates to a method for signal routing in a chip. The chip includes a first port, a first amplifier, a first input path coupling the first port to an input of the first amplifier, a second port, a second amplifier, and a second input path coupling the second port to an input of the second amplifier. The method includes receiving a first radio frequency (RF) signal via the first port, inputting the first RF signal to the input of the first amplifier via the first input path, receiving a second RF signal via the first port, routing the second RF signal from the first input path to the second input path, and inputting the second RF signal to the input of the second amplifier via the second input path.

A fourth aspect relates to an apparatus for signal routing. The apparatus includes means for receiving a first radio-frequency (RF) signal and a second RF signal via a common port, means for routing the first RF signal to an input of a first amplifier, and means for routing the second RF signal to an input of a second amplifier.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, wellknown structures and components are shown in block diagram form in order to avoid obscuring such concepts.

Figure 1:
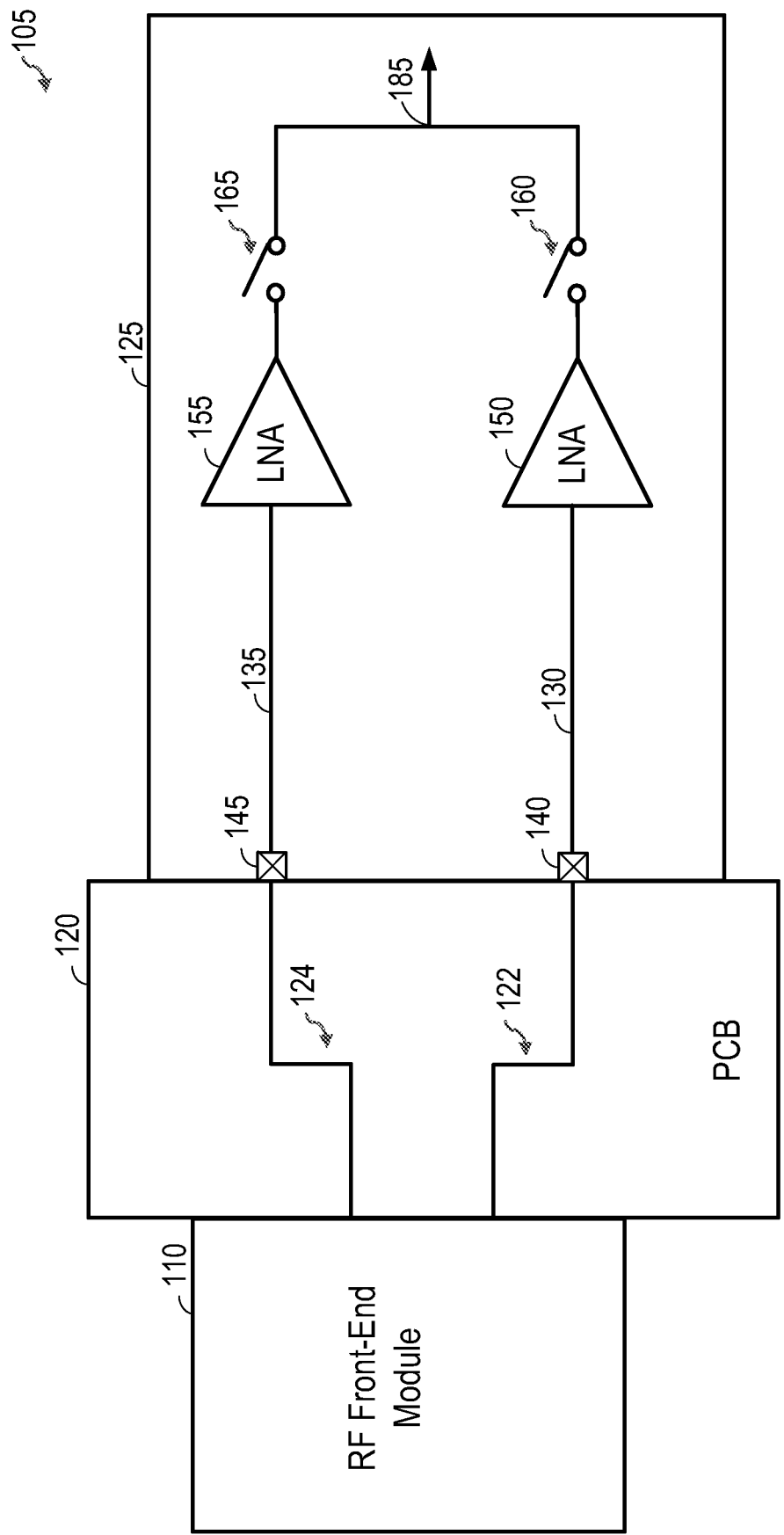
FIG. 1 shows an example of a receiver according to certain aspects of the present disclosure.

FIG. 1 shows an example of a receiver 105 including an RF front-end module 110 and a chip 125. In certain aspects, the receiver 105 may support multiple communications technologies such as LTE and 5G. For example, the receiver 105 may combine LTE ultra high band (UHB) and sub-6 gigahertz (SUB6) 5G. The receiver 105 may be incorporated in a mobile wireless device (e.g., a handset), a small base station (e.g., customer premises equipment (CPE)), or another type of wireless device.

The RF front-end module 110 is coupled to one or more antennas (not shown) used for receiving and/or transmitting radio frequency (RF) signals. The RF front-end module 110 may include low-noise amplifiers (LNAs), filters, power amplifiers, and/or other RF front-end components. As used herein, "a front-end RF module" is a module including one or more RF front-end components (e.g., LNAs, filters, and/or power amplifiers).

The chip 125 is coupled to the RF front-end module 110 via a first route 122 and a second route 124 on a substrate 120 (e.g., a printed circuit board (PCB)). Each route 122 and 124 may include one or more metal lines (e.g., metal traces) on the substrate 120. Although two routes 122 and 124 are shown in FIG. 1, it is to be appreciated that the chip 125 may be coupled to the RF front-end module 110 by one or more additional routes (not shown).

The chip 125 includes a first LNA 150 and a second LNA 155. The first LNA 150 is configured to amplify RF signals in a first frequency band and the second LNA 155 is configured to amplify RF signals in a second frequency band. In this example, the first and second LNAs 150 and 155 may provide amplification over a wide frequency range covering the first and second frequency bands. In one example, the first frequency band may be between 3.3 to 4.2 GHz and the second frequency band may be between 4.4 to 6 GHz, or vice versa. However, it is to be appreciated that the first frequency band and the second frequency band are not limited to the exemplary frequency ranges give above. The first LNA 150 may support intra-band carrier aggregation in the first frequency band, and the second LNA 155 may support intra-band carrier aggregation in the second frequency band.

The chip 125 also includes a first port 140, a first input path 130 coupling the first port 140 to the input of the first LNA 150, a second port 145, and a second input path 135 coupling the second port 145 to the input of the second LNA 155. Each input path 130 and 135 may comprise one or more metal lines on the chip 125. Each port 140 and 145 is configured to couple the respective input path to a respective one of the routes 122 and 124 on the substrate 120. For example, each port 140 and 145 may be implemented with a respective pad on the chip 125, in which the respective pad is coupled to the respective route 122 and 124 on the substrate 120 (e.g., PCB) using soldering, flip-chip mounting, wire bonding, etc.

In the example in FIG. 1, the chip 125 also includes a switch 160 coupled between the output of the first LNA 150 and an output 185, and a switch 165 coupled between the output of the second LNA 155 and the output 185. During operation, the switches 160 and 165 may be used to selectively couple the output of one of the LNAs 150 and 155 to the output 185 at a time (e.g., depending on which of the first and second frequency bands is currently being used). The output 185 may be coupled to a frequency downconverter (not shown) configured to frequency down convert signals from the LNAs 150 and 155 into baseband signals or intermediate frequency signals for further processing.

The chip 125 may include additional components not shown in FIG. 1 including mixers, filters, power amplifiers, etc. In some implementations, the chip 125 may include both receiver components (e.g., LNAs) and transmitter components (e.g., power amplifiers). In these implementations, the chip 125 may be referred to as a transceiver chip.

In the example in FIG. 1, the first LNA 150 and the second LNA 155 are coupled to the RF front-end module 110 via two dedicated routes 122 and 124 on the substrate 120 (e.g., PCB). In a wireless device comprising multiple antennas (e.g., for multiple-in multiple-out (MIMO) communication), the chip 125 may include multiple pairs of LNAs, in which each pair of LNAs requires two dedicated routes on the substrate 120. As the number of antennas increases (e.g., to support 5G), the number of routes on the substrate 120 may significantly increase, which can significantly increase routing complexity on the substrate 120. Accordingly, techniques for reducing routing complexity on the substrate 120 are desirable.

Aspects of the present disclosure provide routing flexibility in which one port can be used to receive RF signals for two or more LNAs to reduce routing on the substrate (e.g., PCB), as discussed further below.

Figure 2A:
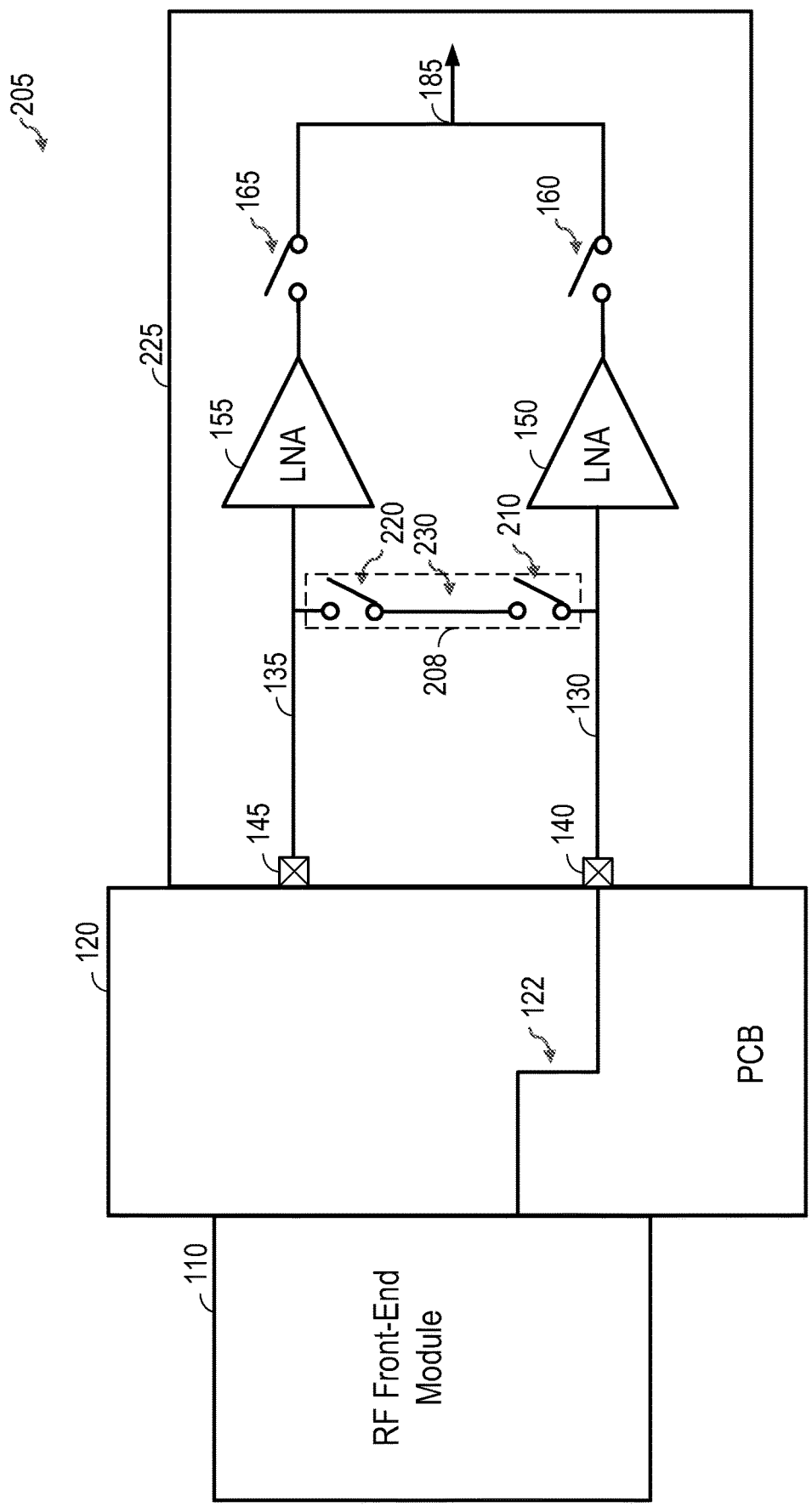
FIG. 2A shows an example of a chip including a switchable path being used in a first one of three routing options according to certain aspects of the present disclosure.

FIG. 2A shows an example of the receiver 205 in which the chip 225 includes a switchable path 208 that provides routing flexibility on the substrate 120 (e.g., PCB). As used herein, a "switchable path" is a path that includes one or more switches. In the example in FIG. 2A, the switchable path 208 is coupled between the first input path 130 and the second input path 135. The switchable path 208 provides routing flexibility by allowing the LNAs 150 and 155 to be coupled to the RF front-end module 110 via one of the ports 140 and 145, which reduces routing on the substrate 120 by half, as discussed further below.

In the example in FIG. 2A, the switchable path 208 includes a first switch 210 coupled to the first input path 130, a second switch 220 coupled to the second input path 135, and a transmission line 230 coupled between the first switch 210 and the second switch 220. The transmission line 230 may comprise one or more metal lines on the chip 225. The first switch 210 is located next to the first input path 130 and the second switch 220 is located next to the second input path 135. Each of the switches 210 and 220 may be implemented with a transistor (e.g., an n-type field effect transistor (NFET) or a p-type field effect transistor (PFET)), a transmission gate, or another type of switch.

Although the switchable path 208 includes two switches (i.e., the first switch 210 and the second switch 220) in the example shown in FIG. 2A, it is to be appreciated that the switchable path 208 is not limited to this example. In other implementations, the switchable path 208 may include one switch or more than two switches. In general, the switchable path 208 includes one or more switches, and may be configured to couple the first input path 130 and the second input path 135 when the one or more switches are closed and decouple the first input path 130 and the second input path 135 when the one or more switches are open.

The switchable path 208 provides three routing options for routing between the RF front-end module 110 and the chip 225 on the substrate 120 (e.g., PCB), as discussed below.

In a first routing option, the first and second LNAs 155 and 150 are coupled to the RF front-end module 110 via the first port 140 to reduce routing on the substrate 120 by half. An example of the first routing option is shown in FIG. 2A, in which the first port 140 is coupled to the RF front-end module 110 via the first route 122. In this example, the second route 124 shown in FIG. 1 is omitted, which reduces routing complexity compared with FIG. 1. In the first routing option, the switches 210 and 220 are opened when the first LNA 150 is being used for signal amplification in the first frequency band. The placement of the first switch 210 next to the first input path 130 reduces loading on the first input path 130 by isolating the first input path 130 from the transmission line 230, which prevents the transmission line 230 from loading the first input path 130.

The switches 210 and 220 are closed when the second LNA 155 is being used for signal amplification in the second frequency band. In this case, RF signals for the second LNA 155 are received via the first port 140 and routed to the input of the second LNA 155 via the switchable path 208. The switchable path 208 degrades the noise figure of the second LNA 155 somewhat due to losses in the switches 210 and 220 and the transmission line 230. Thus, the reduction in routing in the first routing option comes at the expense of some loss in performance for the second frequency band. In the first routing option, the port 140 is a common port for receiving RF signals in the first frequency band and RF signals in the second frequency band.

Figure 2B:
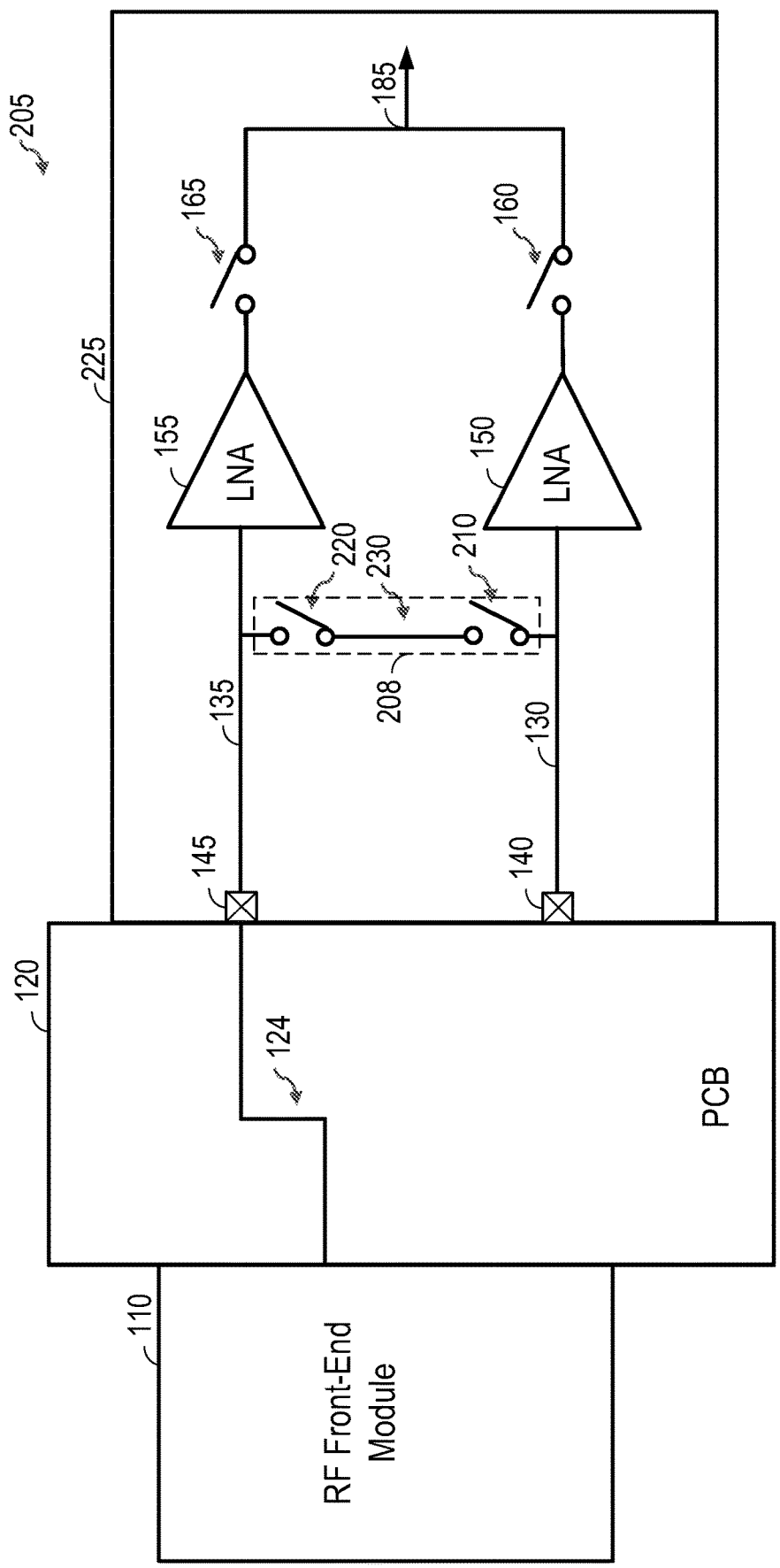
FIG. 2B shows an example of the chip being used in a second one of the three routing options according to certain aspects of the present disclosure.

In a second routing option illustrated in FIG. 2B, the first and second LNAs 155 and 150 are coupled to the RF front-end module 110 via the second port 145 to reduce routing on the substrate 120 by half. In this example, the first route 122 shown in FIG. 1 is omitted, which reduces routing complexity compared with FIG. 1. In the second routing option, the switches 210 and 220 are opened when the second LNA 155 is being used for signal amplification in the second frequency band. The placement of the second switch 220 next to the second input path 135 reduces loading on the second input path 135 by isolating the second input path 135 from the transmission line 230, which prevents the transmission line 230 from loading the second input path 135.

The switches 210 and 220 are closed when the first LNA 150 is being used for signal amplification in the first frequency band. In this case, RF signals for the first LNA 150 are received via the second port 145 and routed to the input of the first LNA 150 via the switchable path 208. The switchable path 208 degrades the noise figure of the first LNA 150 somewhat due to losses in the switches 210 and 220 and the transmission line 230. Thus, the reduction in routing in the second routing option comes at the expense of some loss in performance for the first frequency band. In the second routing option, the port 145 is a common port for receiving RF signals in the first frequency band and RF signals in the second frequency band.

Thus, the first routing option and the second routing option reduce routing in half by routing RF signals for the first and second LNAs 150 and 155 through one of the ports 140 and 145 instead of having a dedicate route for each port. The first routing option routes the RF signals through the first port 140 at the expense of some performance loss for the second frequency band, and the second routing option routes the RF signals through the second port 145 at the expense of some performance loss for the first frequency band. The first routing option or the second routing option may be chosen based on which of the first and second frequency bands is favored. For example, if the first frequency band is favored, then the first routing option (illustrated in FIG. 2A) may be chosen, which reduces routing by half at the expense of some performance loss for the second frequency band. If the second frequency band is favored, then the second routing option (illustrated in FIG. 2B) may be chosen, which reduces routing by half at the expense of some performance loss for the first frequency band. In one example, the favored frequency band may be based on a geographical region in which a wireless device incorporating the chip 225 is expected to be primarily used. In this example, the favored frequency band may be a frequency band that is used in the region. For example, if the second frequency band is used in the region, then the second frequency band may be favored over the first frequency band, in which case, the second routing option may be chosen.

Figure 2C:
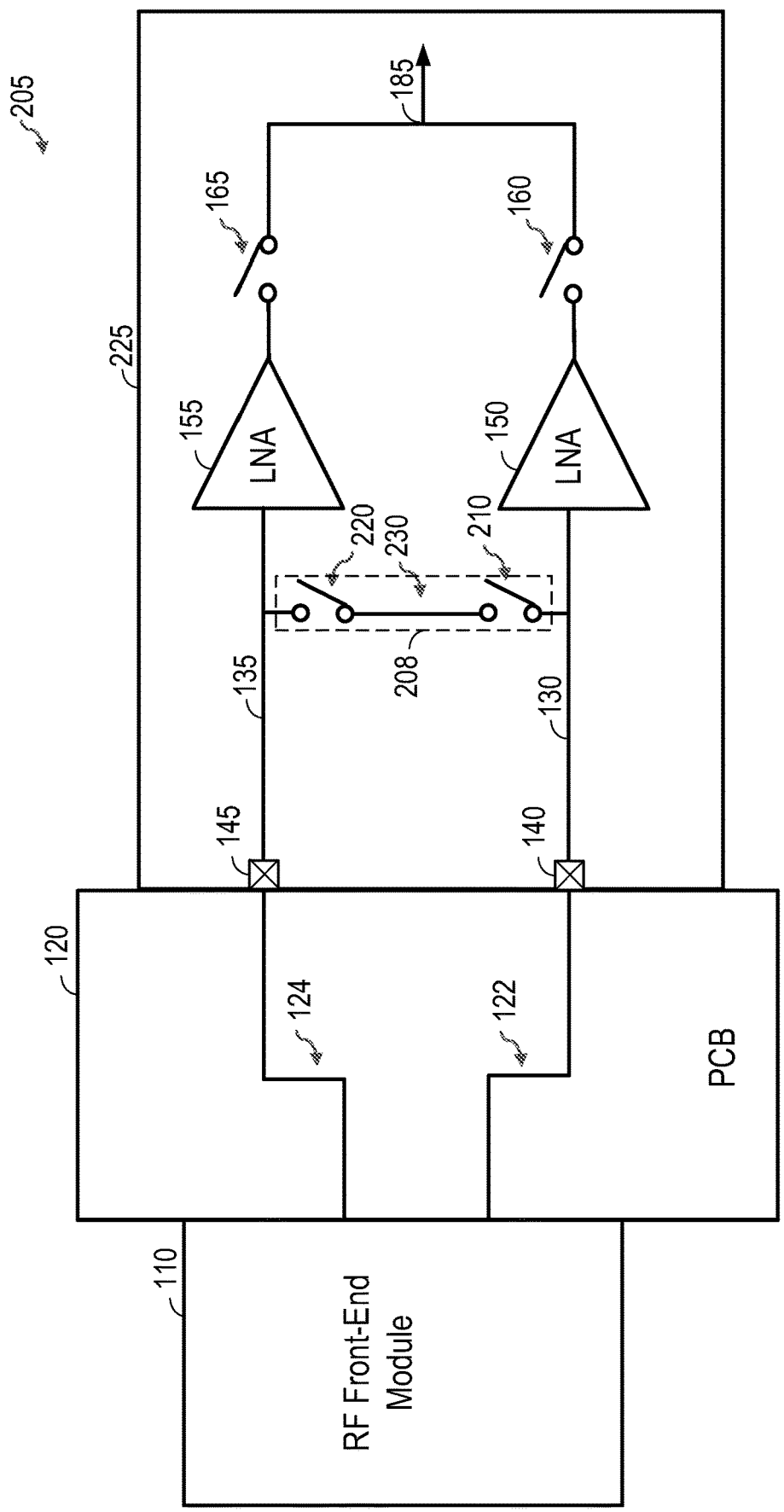
FIG. 2C shows an example of the chip being used in a third one of the three routing options according to certain aspects of the present disclosure.

The switchable path 208 also supports a third routing option in which dedicated routes 122 and 124 are used for the LNAs 150 and 155. An example of the third routing option is shown in FIG. 2C in which the first LNA 150 is coupled to the RF front-end module 110 via the first port 140, and the second LNA 155 is coupled to the RF front-end module 110 via the second port 145. In this example, the switches 210 and 220 in the switchable path 208 are opened for both the first frequency band and the second frequency band. The third routing option may be used in cases where performance for both the first and second frequency bands outweighs routing complexity on the substrate 120 (e.g., PCB).

Thus, the switchable path 208 between the first input path 130 and the second input path 135 supports three different routing options, which provides routing flexibility between the RF front-end module 110 and the chip 225. By supporting different routing options, the same chip can be used in different wireless devices using different routing schemes. Using the same chip for different routing schemes may reduce development and manufacturing costs compared with developing and manufacturing different chips for different routing schemes.

Figure 3:
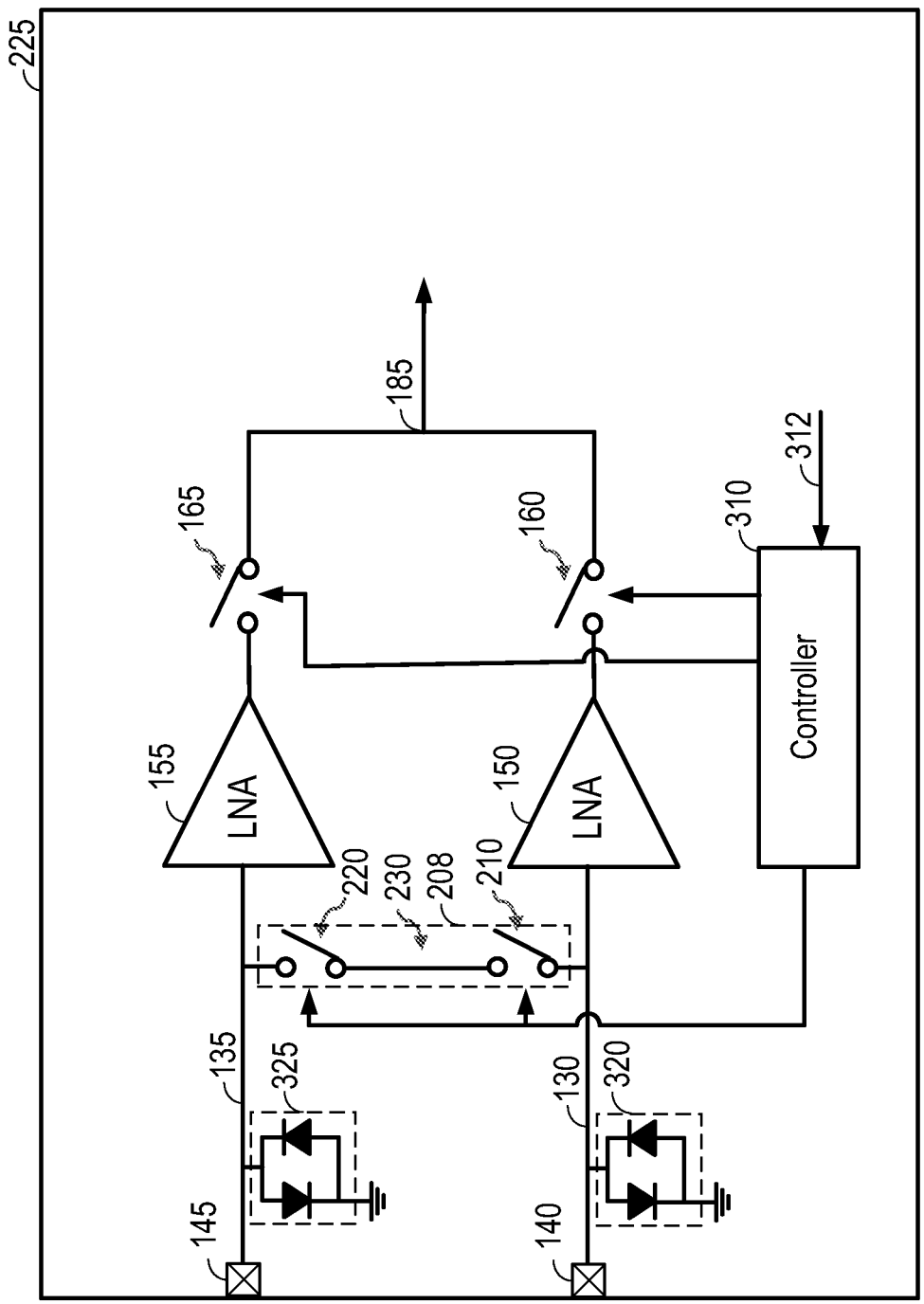
FIG. 3 shows an example of a chip including a controller for controlling the switchable path according to certain aspects of the present disclosure.

FIG. 3 shows an example in which the chip 225 includes a controller 310 configured to control the on/off states of the switches 210 and 220 in the switchable path 208. In certain aspects, the controller 310 is configured to operate the switchable path 208 in one of three routing modes depending on which routing option is chosen. The routing modes includes a first routing mode corresponding to the first routing option, a second routing mode corresponding to the second routing option, and a third routing mode corresponding to the third routing option. Once the routing option that will be used with the chip 225 is known, the controller 310 may be programmed to operate the switchable path 208 in the corresponding routing mode. For each routing mode, the controller 310 is configured to control the on/off states of the switchable path 208 depending on which of the first and second frequency bands is currently selected, as discussed further below.

The controller 310 may also be configured to control the on/off states of the switches 165 and 160 based on the selected frequency band. As discussed above, switch 160 is coupled between the output of the first LNA 150 and the output 185, and switch 165 is coupled between the output of the second LNA 155 and the output 185. In the discussion below, switch 160 is referred to as the third switch 160 and switch 165 is referred to as the fourth switch 165.

In certain aspects, the controller 310 is configured to receive a control signal 312 indicating which one of the first frequency band and the second frequency band is currently selected. In one example, the control signal 312 may have a first logic value indicating the first frequency band and a second logic value indicating the second frequency band. However, it is to be appreciated that the control signal 312 is not limited to this example. For example, it is to be appreciated that the control signal 312 is not limited to a single physical signal. In other examples, the control signal 312 may comprise multiple physical signals.

To provide the chip 225 with electrostatic discharge (ESD) protection, the chip 225 may also include a first ESD circuit 320 coupled to the first port 140, and a second ESD circuit 325 coupled to the second port 145. Each ESD circuit 320 and 325 is configured to discharge static charge that is unintentionally transferred to the respective port from an external source (e.g., during handling of the chip 225) to prevent the charge from damaging circuitry (e.g., respective LNA 150 and 155) coupled to the respective port. In the example shown in FIG. 3, each ESD circuit 320 and 325 is implemented with diodes that provide a discharge path from the respective port to ground during an ESD event. However, it is to be appreciated that the ESD circuits 320 and 325 are not limited to the exemplary implementation shown in FIG. 3.

Exemplary operations of the controller 310 will now be described according to certain aspects.

In one example, the chip 125 may be used in a first wireless device using the first routing option in which the first route 122 routes RF signals for both LNAs 150 and 155, and the second route 124 is omitted. In this example, the chip 125 receives RF signals for both LNAs 150 and 155 via the first port 140, and the controller 310 is programmed to operate the switchable path 208 in the first routing mode. In this example, the second port 145 is not used to receive RF signals for the second LNA 155 and the second port 145 is not coupled to a route on the substrate 120 (illustrated in FIG. 2A). Although the second port 145 is not used in this example, the second port 145 is present on the chip 125 in order to support the second routing option and the third routing option (e.g., for another wireless device that uses the second routing option or the third routing option).

Figure 4A:
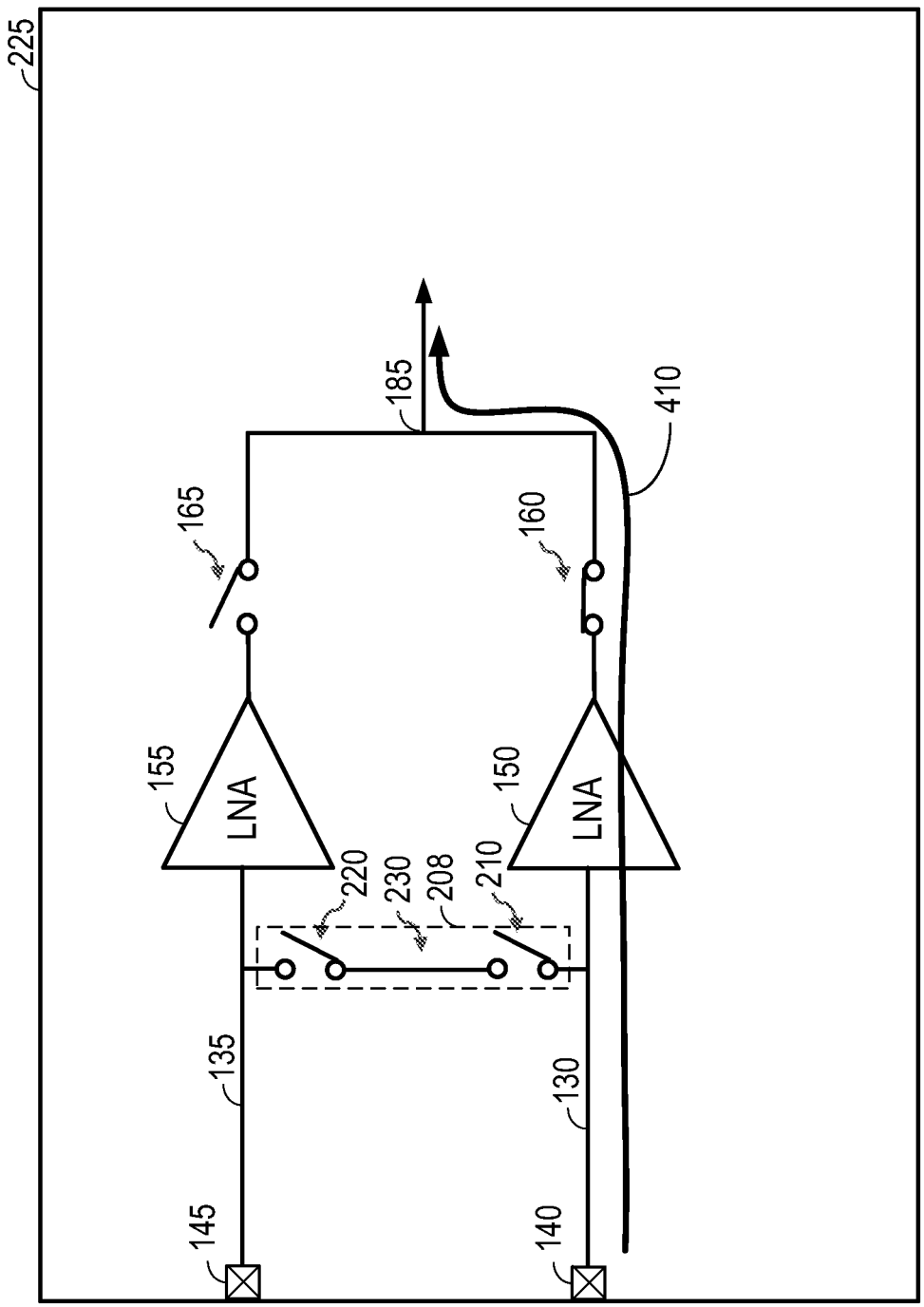
FIG. 4A shows an exemplary signal path for an RF signal in the chip for a first routing mode and a first frequency band according to certain aspects of the present disclosure.

In the first routing mode, the controller 310 opens the first switch 210 and the second switch 220 when the control signal 312 indicates the first frequency band (i.e., the first frequency band is selected). The controller 310 also closes the third switch 160 and opens the fourth switch 165, which couples the output of the first LNA 150 to the output 185 and decouples the output of the second LNA 155 from the output 185. In this case, a first RF signal received by the first port 140 is input to the first LNA 150. The first LNA 150 amplifies the first RF signal in the first frequency band, and outputs the resulting amplified signal to the output 185. The path 410 of the first RF signal in this case is illustrated in FIG. 4A. As shown in FIG. 4A, the first RF signal propagates from the first port 140 to the input of the first LNA 150 via the first input path 130 without passing through the switchable path 208. Since the first RF signal does not pass through the switchable path 208 in this case, the switchable path 208 has little to no impact on the first RF signal. As a result, the switchable path 208 causes little to no degradation in performance for the first frequency band. Note that the ESD circuits 320 and 325 and the controller 310 are not explicitly shown in FIG. 4A for ease of illustration.

Figure 4B:
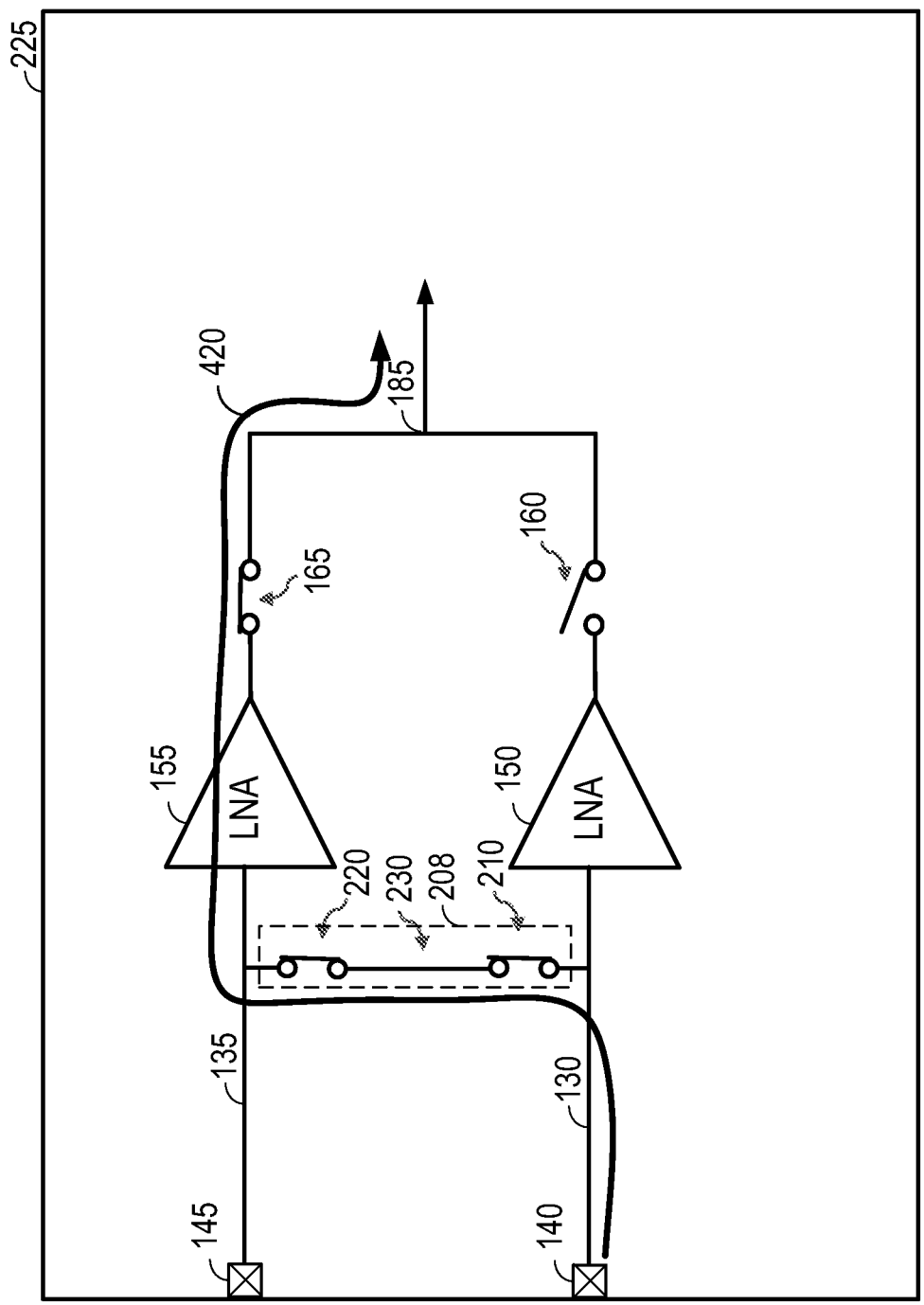
FIG. 4B shows an exemplary signal path for an RF signal in the chip for the first routing mode and a second frequency band according to certain aspects of the present disclosure.

In the first routing mode, the controller 310 closes the first switch 210 and the second switch 220 when the control signal 312 indicates the second frequency band (e.g., the second frequency band is selected). The controller 310 also opens the third switch 160 and closes the fourth switch 165, which couples the output of the second LNA 155 to the output 185 and decouples the output of the first LNA 150 from the output 185. In this case, the switchable path 208 routes a second RF signal received by the first port 140 to the input of the second LNA 155. The second LNA 155 amplifies the second RF signal in the second frequency band, and outputs the resulting amplified signal to the output 185. The path 420 of the second RF signal in this case is illustrated in FIG. 4B. As shown in FIG. 4B, the second RF signal is routed from the first input path 130 to the second input path 135 via the switchable path 208. Note that the ESD circuits 320 and 325 and the controller 310 are not explicitly shown in FIG. 4B for ease of illustration.

In another example, the chip 225 may be used in a second wireless device using the second routing option in which the second route 124 routes RF signals for both LNAs 150 and 155, and the first route 122 is omitted. In this example, the chip 125 receives RF signals for both LNAs 150 and 155 via the second port 145, and the controller 310 is programmed to operate the switchable path 208 in the second routing mode. In this example, the first port 140 is not used to receive RF signals for the first LNA 150 and the first port 140 is not coupled to a route on the substrate 120 (illustrated in FIG. 2B). Although not used in this example, the first port 140 is present on the chip 125 to support the first routing option and the third routing option (e.g., for another wireless device that uses the first routing option or the third routing option).

Figure 5A:
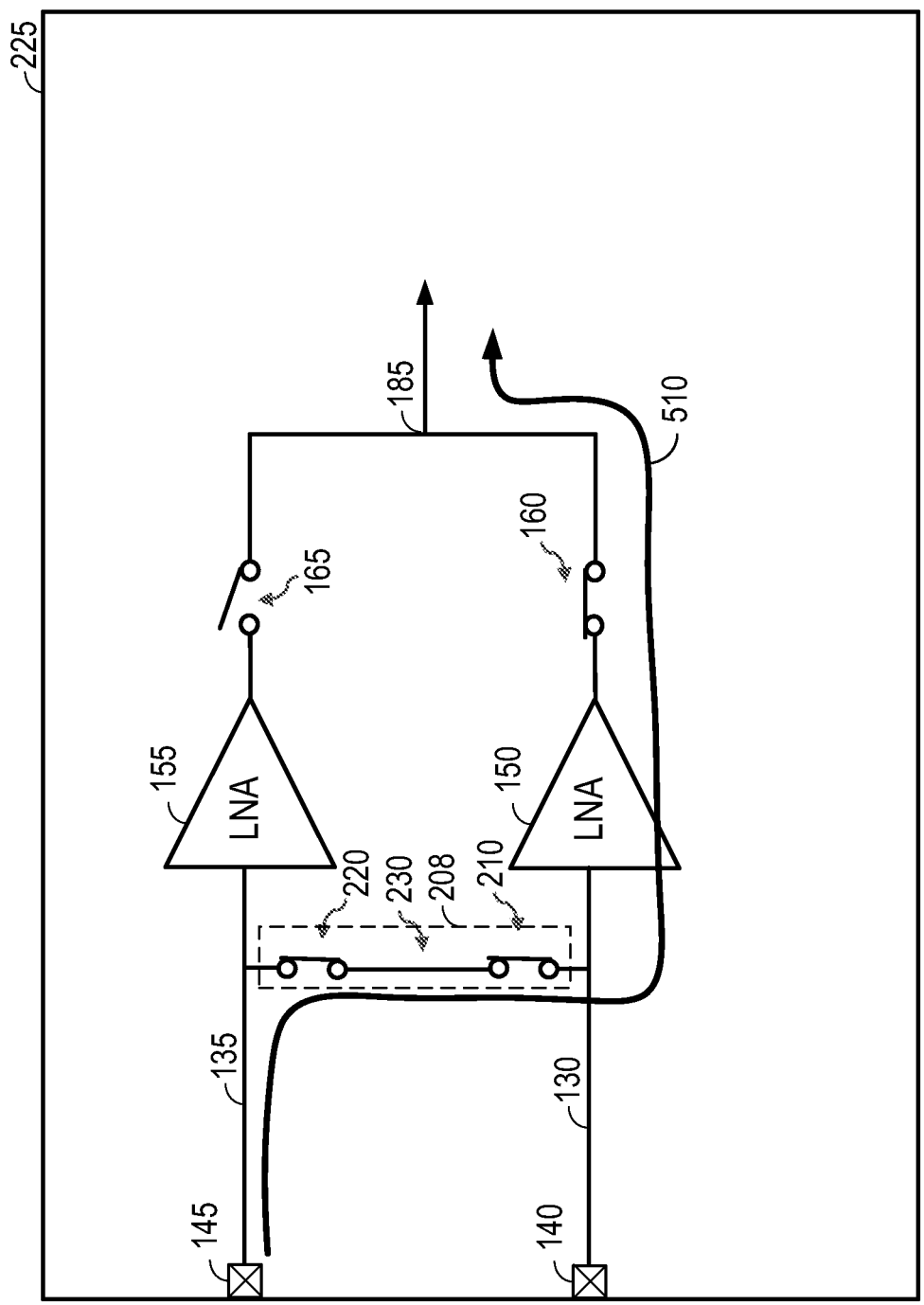
FIG. 5A shows an exemplary signal path for an RF signal in the chip for a second routing mode and the first frequency band according to certain aspects of the present disclosure.

In the second routing mode, the controller 310 closes the first switch 210 and the second switch 220 when the control signal 312 indicates the first frequency band (i.e., the first frequency band is selected). The controller 310 also closes the third switch 160 and opens the fourth switch 165, which couples the output of the first LNA 150 to the output 185 and decouples the output of the second LNA 155 from the output 185. In this case, the switchable path 208 routes a first RF signal received by the second port 145 to the input of the first LNA 150. The first LNA 150 amplifies the first RF signal in the first frequency band, and outputs the resulting amplified signal to the output 185. The path 510 of the first RF signal in this case is illustrated in FIG. 5A. As shown in FIG. 5A, the first RF signal is routed from the second input path 135 to the first input path 130 via the switchable path 208. Note that the ESD circuits 320 and 325 and the controller 310 are not explicitly shown in FIG. 5A for ease of illustration.

Figure 5B:
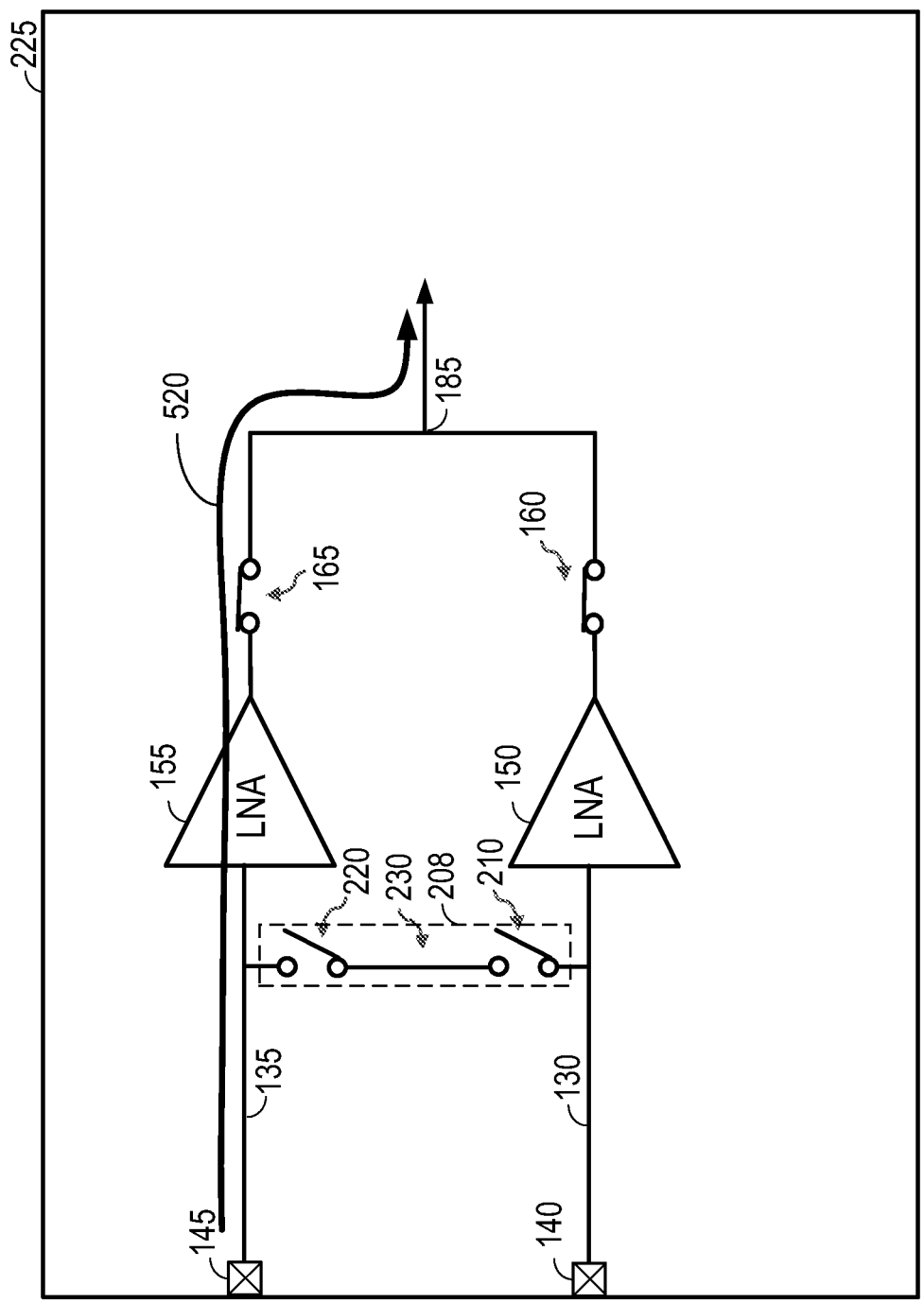
FIG. 5B shows an exemplary signal path for an RF signal in the chip for the second routing mode and the second frequency band according to certain aspects of the present disclosure.

In the second routing mode, the controller 310 opens the first switch 210 and the second switch 220 when the control signal 312 indicates the second frequency band (i.e., the second frequency band is selected). The controller 310 also opens the third switch 160 and closes the fourth switch 165, which couples the output of the second LNA 155 to the output 185 and decouples the output of the first LNA 150 from the output 185. In this case, a second RF signal received by the second port 145 is input to the second LNA 155. The second LNA 155 amplifies the second RF signal in the second frequency band, and outputs the resulting amplified signal to the output 185. The path 520 of the second RF signal in this case is illustrated in FIG. 5B. As shown in FIG. 5B, the second RF signal propagates from the second port 145 to the input of the second LNA 155 via the second input path 135 without passing through the switchable path 208. Since the second RF signal does not pass through the switchable path 208 in this case, the switchable path 208 has little to no impact on the second RF signal. As a result, the switchable path 208 causes little to no degradation in performance for the second frequency band. Note that the ESD circuits 320 and 325 and the controller 310 are not explicitly shown in FIG. 5B for ease of illustration.

In yet another example, the chip 225 may be used in a third wireless device using the third routing option in which the first route 122 routes RF signals for the first LNA 150 and the second route 124 routes RF signals for the second LNA 155 (illustrated in FIG. 2C). Also, the controller 310 is programmed to operate the switchable path 208 in the third routing mode. In this example, the chip 125 receives RF signals for first LNA 150 via the first port 140 and receives RF signals for the second LNA 155 via the second port 145. In this example, the switchable path 208 is not used for routing RF signals between the input paths 130 and 135. Although not used in this example, the switchable path 208 is present on the chip 125 to support the first routing option and the second routing option.

In the third routing mode, the controller 310 opens the first switch 210 and the second switch 220 for both the first frequency band and the second frequency band. In this mode, the controller 310 closes the third switch 160 and opens the fourth switch 165 when the control signal 312 indicates the first frequency band, and opens the third switch 160 and closes the fourth switch 165 when the control signal 312 indicates the second frequency band.

In the third routing mode, a first RF signal received by the first port 140 for the first frequency band propagates from the first port 140 to the input of the first LNA 150 via the first input path 130 without passing through the switchable path 208. Also, a second RF signal received by the second port 145 for the second frequency band propagates from the second port 145 to the input of the second LNA 155 via the second input path 135 without passing through the switchable path 208. Thus, in the third routing mode, neither RF signal passes through the switchable path 208. Accordingly, for cases where the third routing option is chosen, the presence of the switchable path 208 has little to no impact on performance for both frequency bands.

It is to be appreciated that the chip 225 may include additional components not shown in FIGS. 2A, 2B, 2C and 3. For example, the chip 225 may also include an adjustable attenuator in each of the input paths 130 and 135 to adjust the sensitivity of the respective one of the LNAs 150 and 155.

In some implementations, the substrate 120 (e.g., PCB) may extend underneath the chip 225 in which the chip 225 is mounted (e.g., flip-chip mounted) on the substrate 120.

Figure 6:
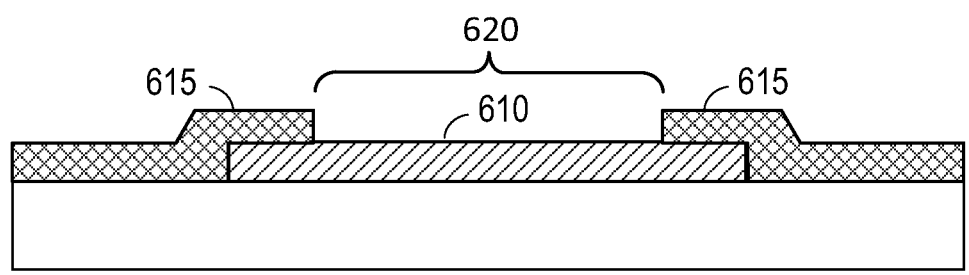
FIG. 6 shows an example of a port implemented with a pad according to certain aspects of the present disclosure.

FIG. 6 shows a cross-sectional view of an exemplary pad 610 according to certain aspects. Each of the first port 140 and the second port 145 may be implemented with the exemplary pad 610 (e.g., each of the first port 140 and the second port 145 may be a separate instance of the pad 610). The pad 610 may comprise one or more metal layers (e.g., aluminum, copper, etc.). The pad 610 is coupled to the respective one of the first input path 130 and the second input path 135 (not shown in FIG. 6).

In this example, the chip 225 includes a top passivation layer 615 (e.g., silicon oxide) to protect chip structures underneath the passivation layer 615 from the outside environment. A portion 620 of the passivation layer 615 over the pad 610 is removed to expose an area of the pad 610. The exposed area of the pad 610 provides an electrical contact surface for electrically coupling the pad 610 to a route on the substrate 120. The pad 610 may be coupled to the route by a solder bump, a wire bond, etc.

As discussed above, in the first and second routing options, one of the first port 140 and the second port 145 is not used. In these options, the pad 610 implementing the unused port may not be coupled to a route on the substrate 120 (e.g., PCB)).

It is to be appreciated that the first port 140 and the second port 145 are not limited to the exemplary implementation shown in FIG. 6.

Figure 7:
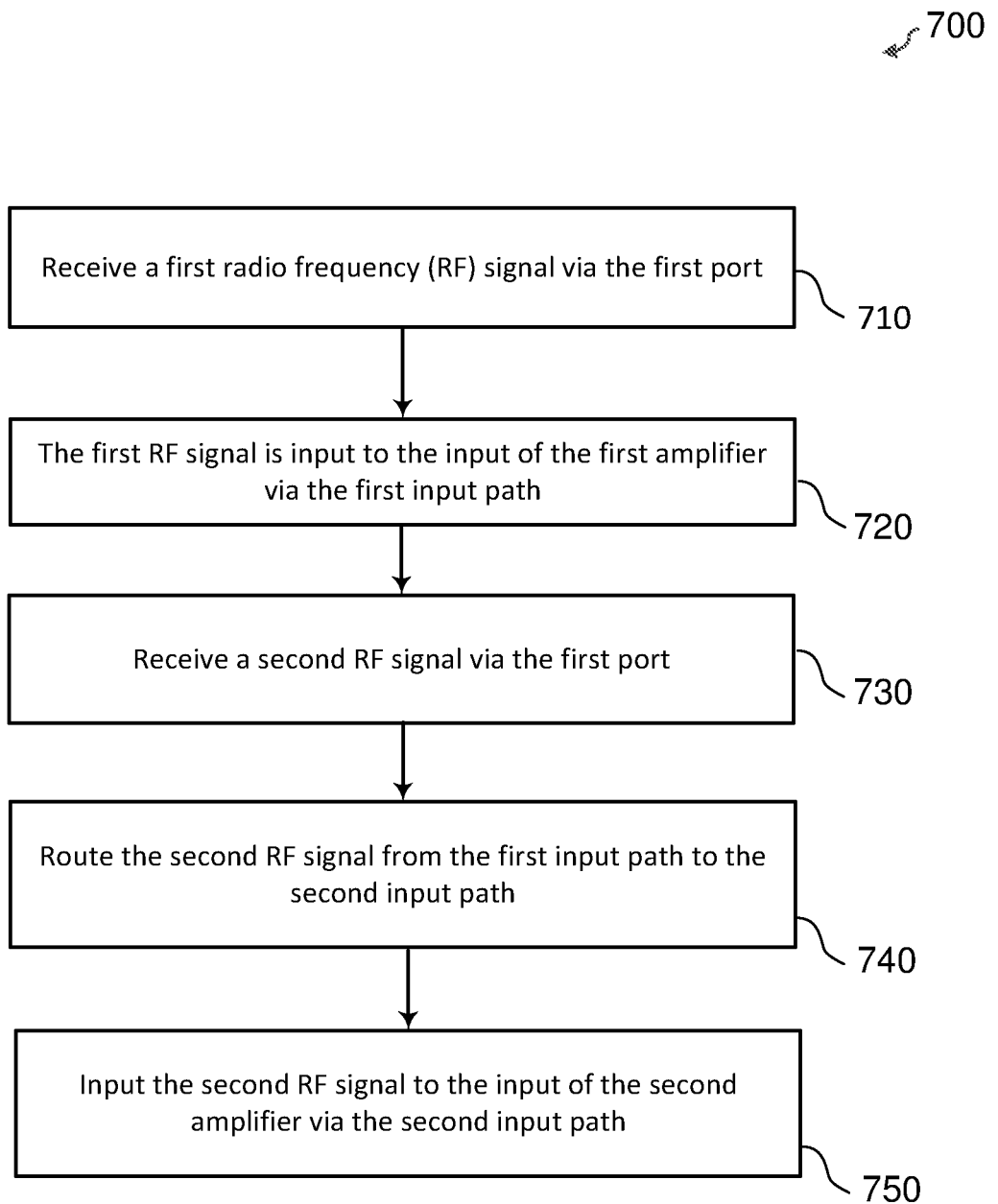
FIG. 7 is a flowchart illustrating a method of signal routing in a chip according to certain aspects of the present disclosure.

FIG. 7 is a flowchart illustrating a method 700 for signal routing in a chip. The chip (e.g., the chip 225) comprises a first port (e.g., the first port 140), a first amplifier (e.g., the first LNA 150), a first input path (e.g., the first input path 130) coupling the first port to an input of the first amplifier, a second port (e.g., the second port 145), a second amplifier (e.g., the second LNA 155), and a second input path (e.g., the second input path 135) coupling the second port to an input of the second amplifier.

At block 710, a first RF signal is received via the first port. For example, the first RF signal may be received by the first port 140 from the front-end RF module 110 via the first route 122 on the substrate 120 (e.g., PCB). In certain aspects, the first RF signal is in the first frequency band.

At block 720, the first RF signal is input to the input of the first amplifier via the first input path. For example, the first RF signal may propagate from the first port to the input of the first amplifier vis the first input path. In certain aspects, the chip may further include a switchable path (e.g., switchable path 208) coupled between the first input path and the second input path. In these aspects, the first RF signal may be input to the input of the first amplifier by opening one or more switches (e.g., switches 210 and 220) in the switchable path.

At block 730, a second RF signal is received via the first port. For example, the second RF signal may be received by the first port 140 from the front-end RF module 110 via the first route 122 on the substrate 120 (e.g., PCB). In certain aspects, the second RF signal is in the second frequency band.

At block 740, the second RF signal is routed from the first input path to the second input path. The second RF signal may be routed from the first input path to the second input path by closing the one or more switches in the switchable path.

At block 750, the second RF signal is input to the input of the second amplifier via the second input path. For example, the second RF signal may propagate from the switchable path to the input of the second amplifier via the second input path 135.

Figure 8:
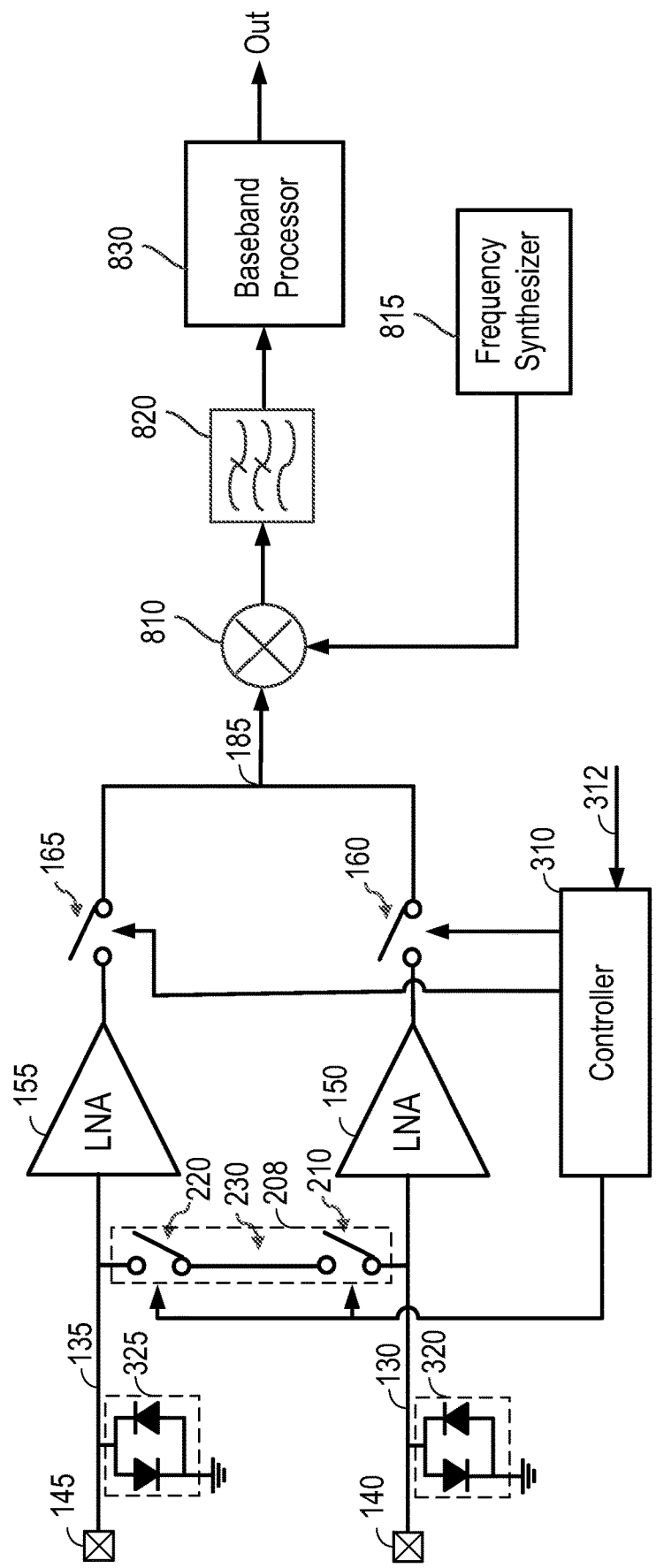
FIG. 8 shows an example of a receiver including a switchable path according to certain aspects of the present disclosure.

FIG. 8 shows an example of components in a receiver that may be coupled to the output 185 to process the output signals of the first and second LNAs 150 and 155 according to certain aspects. In this example, the components include a mixer 810, a filter 820, a baseband processor 830, and a frequency synthesizer 815. The input of the mixer 810 is coupled to the output 185 and the output of the mixer 810 is coupled to the input of the filter 820 (e.g., lowpass filter). The output of the filter 820 is coupled to the baseband processor 830.

In operation, the frequency synthesizer 815 is configured to generate an oscillator signal. The frequency of the oscillator signal may be tunable. The mixer 810 is configured to mix the output signal of the LNA (i.e., LNA 150 or LNA 155) currently coupled to the output 185 with the oscillator signal to frequency down-convert the output signal into a baseband signal. The filter 820 is configured to perform low pass filtering on the baseband signal to remove noise and/or other unwanted signals (e.g., second harmonic from mixer). The baseband processor 830 is configured to process the filtered baseband signal to recover data from the filtered baseband signal. The processing by the baseband processor 830 may include sampling, demodulation, decoding, etc.

Figure 9:
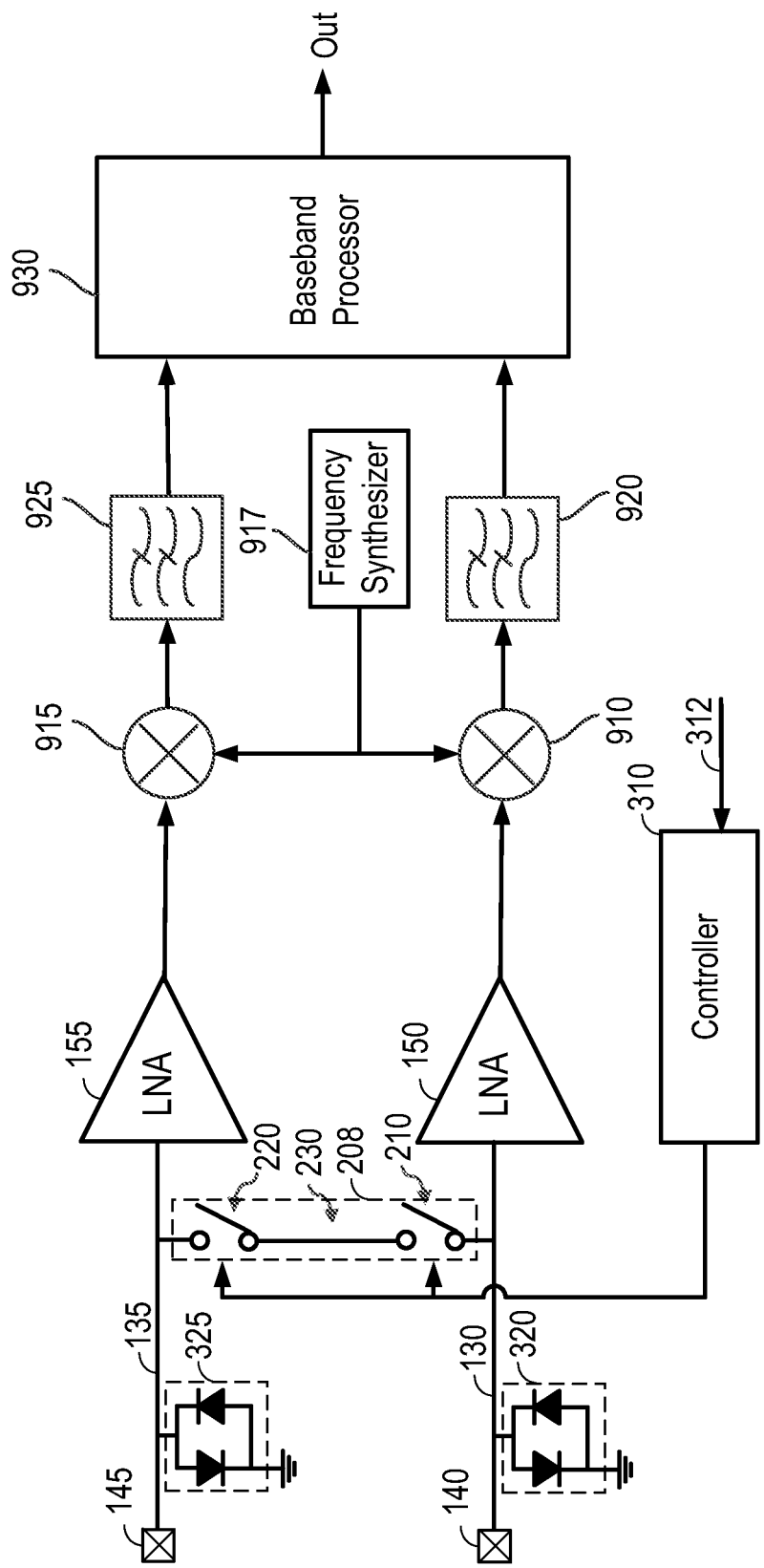
FIG. 9 shows another example of a receiver including a switchable path according to certain aspects of the present disclosure

FIG. 9 shows an example in which the output of the first LNA 150 and the output of the second LNA 155 are coupled to separate receive chains. In this example, the switches 160 and 165 are omitted. The receive chains may share a frequency synthesizer 917 configured to generate an oscillator signal.

The receive chain for the first LNA 150 includes a first mixer 910 and a first filter 920. The input of the first mixer 910 is coupled to the output of the first LNA 150 and the output of the first mixer 910 is coupled to the input of the first filter 920 (e.g., lowpass filter). The output of the first filter 920 is coupled to a baseband processor 930. In operation, the first mixer 910 is configured to mix the output signal of the first LNA 150 with the oscillator signal to frequency down-convert the output signal into a baseband signal. The first filter 920 is configured to perform low pass filtering on the baseband signal to remove noise and/or other unwanted signals. The baseband processor 930 is configured to process the filtered baseband signal to recover data from the filtered baseband signal. The processing may include sampling, demodulation, decoding, etc.

The receive chain for the second LNA 155 includes a second mixer 915 and a second filter 925. The input of the second mixer 915 is coupled to the output of the second LNA 155 and the output of the second mixer 915 is coupled to the input of the second filter 925 (e.g., lowpass filter). The output of the second filter 925 is coupled to the baseband processor 930. In operation, the second mixer 915 is configured to mix the output signal of the second LNA 155 with the oscillator signal to frequency down-convert the output signal into a baseband signal. The second filter 925 is configured to perform low pass filtering on the baseband signal to remove noise and/or other unwanted signals. The baseband processor 930 is configured to process the filtered baseband signal to recover data from the filtered baseband signal.

Figure 10:
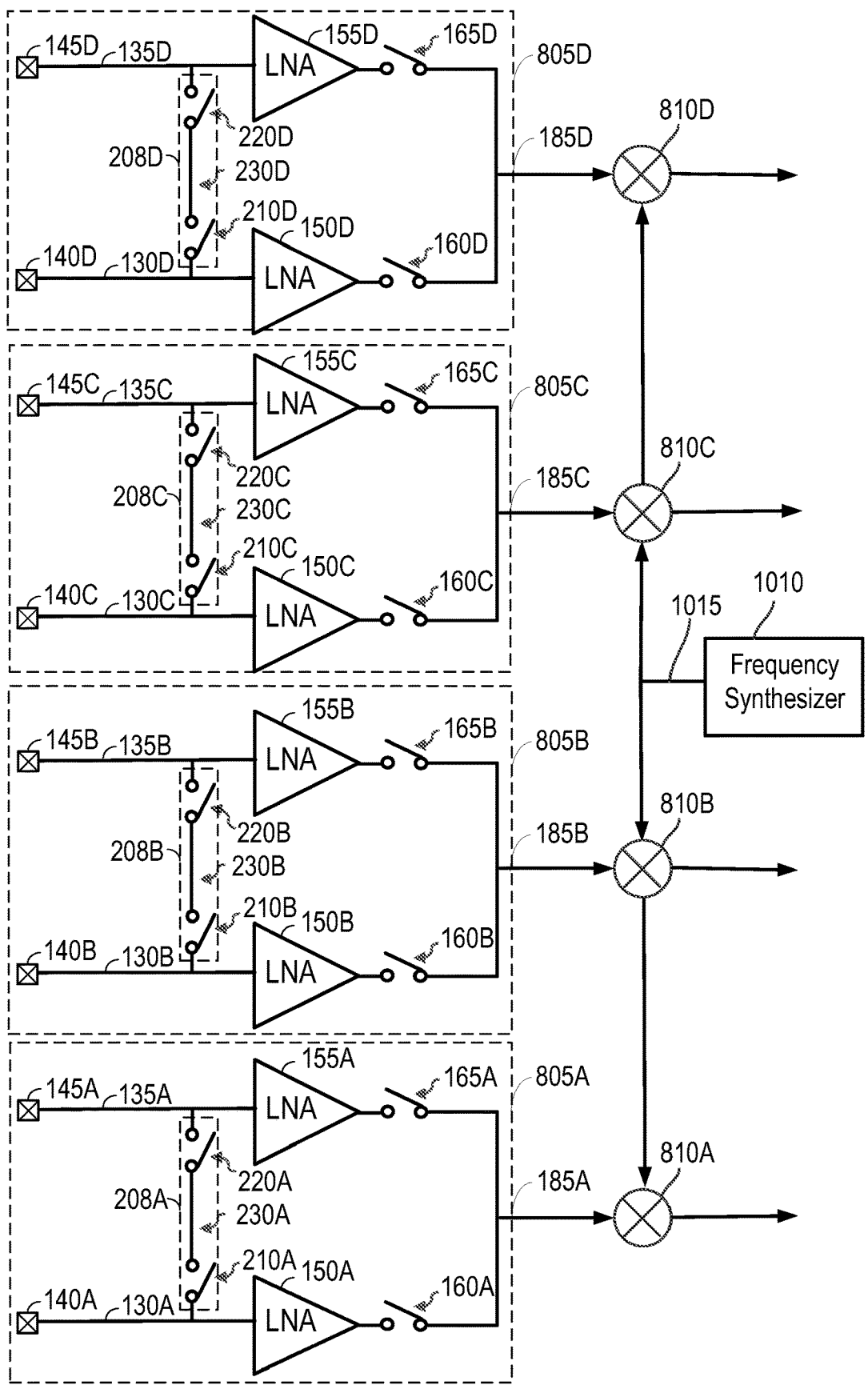
FIG. 10 shows yet another example of a receiver including a switchable path according to certain aspects of the present disclosure.

FIG. 10 shows an example of a system including multiple pairs of LNAs according to aspects of the present disclosure. In this example, the system includes multiple receive circuits 805A to 805D in which each of the receive circuits 805A to 805D includes a respective first LNA 150A to 150D, a respective second LNA 155A to 155D, a respective first input path 130A to 130D, a respective second path 135A to 135D, a respective switchable path 208A to 208D, a respective first output switch 160A to 160D, and a respective second output switch 165A to 165D. Each of the receive circuits 805A to 805D may be used to receive an RF signal from a respective one of multiple antennas (not shown) (e.g., in a MIMO receiver).

In the example in FIG. 10, each of the first LNAs 150A to 150D is configured to amplify RF signals in the first frequency band, and each of the second LNAs 155A and 155D is configured to amplify RF signals in the second frequency band. Each of the first input paths 130A to 130D is coupled between a respective first port 140A to 140D and the input of the respective first LNA 150A to 150D. Each of the second input paths 135A to 135D is coupled between a respective second port 145A to 145D and the input of the respective second LNA 155A to 155D. Each of the first output switches 160A to 160D is coupled between the output of the respective first LNA 150A to 150D and a respective output 185A to 185D. Each of the second output switches 165A to 165D is coupled between the output of the respective second LNA 155A to 155D and the respective output 185A to 185D.

Each of the switchable paths 208A to 208D is coupled between the respective first input path 130A to 130D and the respective second input path 135A to 135D. Each of the switchable paths 208A to 208D provides routing flexibility by allowing the respective first LNA 150A to 150D and the respective second LNA 155A to 150D to be coupled to the RF front-end module 110 via one of the respective first port 140A to 140D and second port 145A to 145B, which reduces routing as discussed above.

In the example in FIG. 10, each of the switchable paths 208A to 208D is implemented with the exemplary switchable path 208 shown in FIGS. 2A to 2C (i.e., each of the switchable paths 208A to 208D is a separate instance of the switchable path 208). However, it is to be appreciated that the switchable paths 208A to 208D are not limited to this example. In other implementations, each of the switchable paths 208A to 208D may include one switch or more than two switches. In general, each of the switchable paths 208A to 208D includes one or more respective switches, and may be configured to couple the respective first input path 130A to 130D and the respective second input path 135A to 135D when the one or more respective switches are closed and decouple the respective first input path 130A to 130B and the respective second input path 135A to 135D when the one or more respective switches are open.

The switchable paths 208A to 208D provide the system with the routing options discussed above.

For example, in the first routing option, each pair of LNAs 150A to 150D and 155A to 155D is coupled to the RF front-end module 110 (not shown in FIG. 10) via the respective first port 140A to 140D. In this example, the controller 312 (not shown in FIG. 10) opens the one or more switches (e.g., switches 210A to 210D and 220A to 220D) in each of the switchable paths 208A to 208D when the first frequency band is selected, and closes the one or more switches (e.g., switches 210A to 210D and 220A to 220D) in each of the switchable paths 208A to 208D when the second frequency band is selected.

In the second routing option, each pair of LNAs 150A to 150D and 155A to 155D is coupled to the RF front-end module 110 (not shown in FIG. 10) via the respective second port 145A to 145D. In this example, the controller 312 (not shown in FIG. 10) opens the one or more switches (e.g., switches 210A to 210D and 220A to 220D) in each of the switchable paths 208A to 208D when the second frequency band is selected, and closes the one or more switches (e.g., switches 210A to 210D and 220A to 220D) in each of the switchable paths 208A to 208D when the first frequency band is selected.

In the third routing option, the one of more switches (e.g., switches 210A to 210D and 220A to 220D) in each of the switchable paths 208A to 208D are open for both the first frequency band and the second frequency band.

In all three routing options, the controller may be configured to close the first output switches 160A to 160D and open the second output switches 165A to 165D when the first frequency band is selected, and close the second output switches 165A to 165D and open the first output switches 160A to 160D when the second frequency is selected.

In the example in FIG. 10, the system also includes a frequency synthesizer 1010 configured to generate an oscillator signal and multiple mixers 810A to 810D. The input of each of the mixers 810A to 810D is coupled to a respective one of the outputs 185A to 185D. In operation, each of the mixers 810A to 810D is configured to mix the output signal at the respective output 185A to 185D with the oscillator signal to frequency down-convert the output signal into a respective baseband signal. The baseband signals from the mixers 810A to 810D may be input to one or more filters (not shown) and a baseband processor (not shown) for further processing. In this example, the output 1015 of the frequency synthesizer 1010 is coupled to the mixers 185A to 185D to provide the mixers 185A to 185D with the oscillator signal.

Figure 11A:
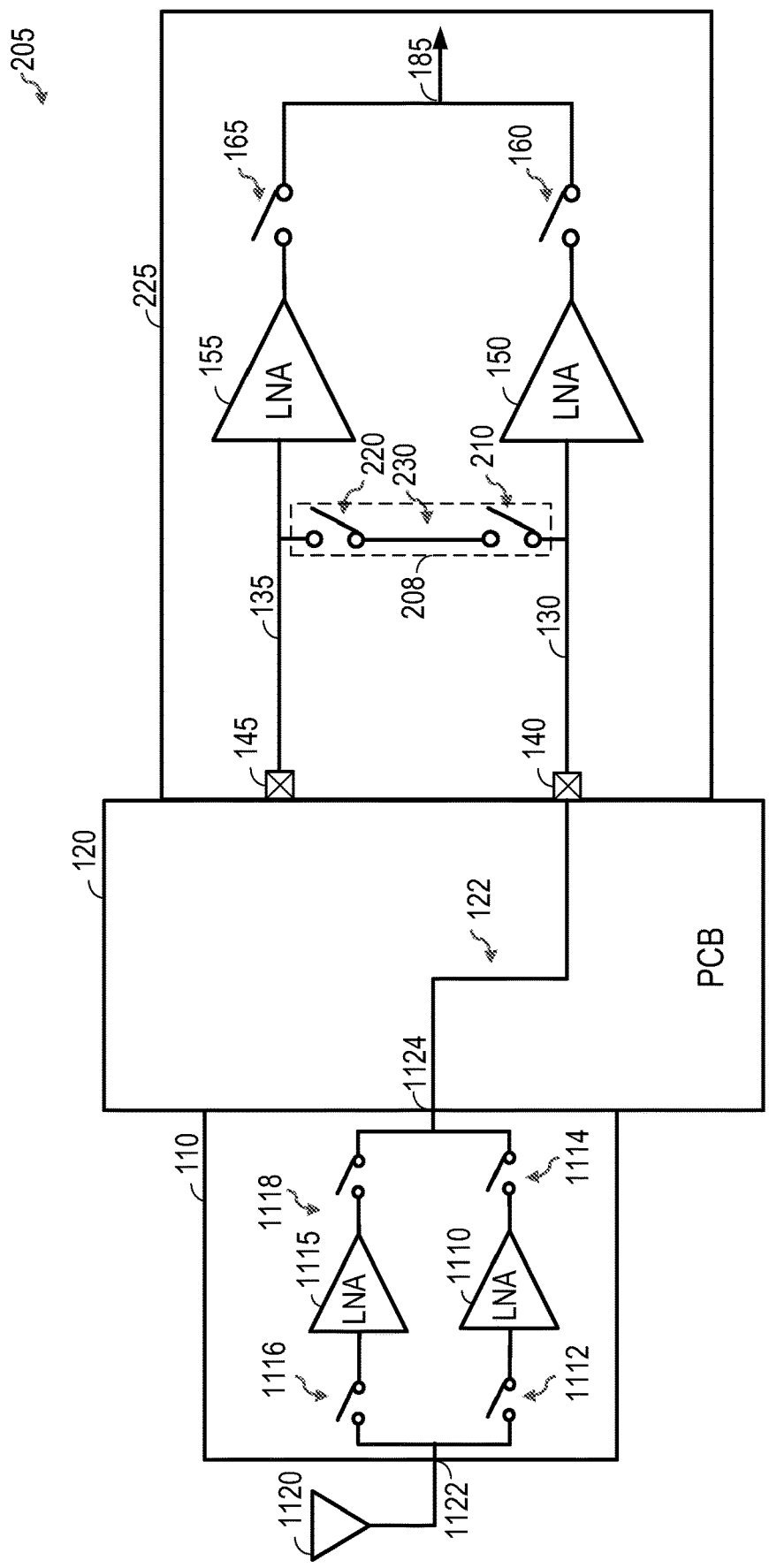
FIG. 11A shows an example of an RF front-end module including one or more LNAs in a first routing option according to certain aspects of the present disclosure.

As discussed above, the RF front-end module 110 may include one or more LNAs. In this regard, FIG. 11A shows an example in which the RF front-end module 110 includes LNAs 1110 and 1115 and switches 1112, 1114, 1116 and 1118. LNA 1110 may be configured to amplify RF signals in the first frequency band and LNA 1115 may be configured to amplify RF signals in the second frequency band. In this example, switch 1112 is coupled between module input 1122 and the input of LNA 1110 and switch 1114 is coupled between the output of the LNA 1110 and module output 1124. Switch 1116 is coupled between module input 1122 and the input of LNA 1115 and switch 1118 is coupled between the output of the LNA 1115 and module output 1124. Module input 1122 may be coupled to an antenna 1120.

In operation, switches 1112 and 1114 may be closed and switches 1116 and 1118 may be open (e.g., by a controller) when the first frequency band is selected. In this case, LNA 1110 is coupled between module input 1122 and module output 1124. Switches 1112 and 1114 may be open and switches 1116 and 1118 may be closed (e.g., by a controller) when the second frequency band is selected. In this case, LNA 1115 is coupled between module input 1122 and module output 1124.

It is to be appreciated that the RF front-end module 110 is not limited to the above example. In some implementations, one or more of the switches 1112, 1114, 1116 and 1118 may be omitted. In some implementations, the RF front-end module 110 may include a broadband LNA instead of the two LNAs 1110 and 1115. In this example, the broadband LNA is coupled between module input 1122 and module output 1124 and the frequency band of the broadband LNA covers both the first and second frequency bands. Thus, at least one LNA may be coupled between the module input 1122 and the module output 1124.

Figure 11B:
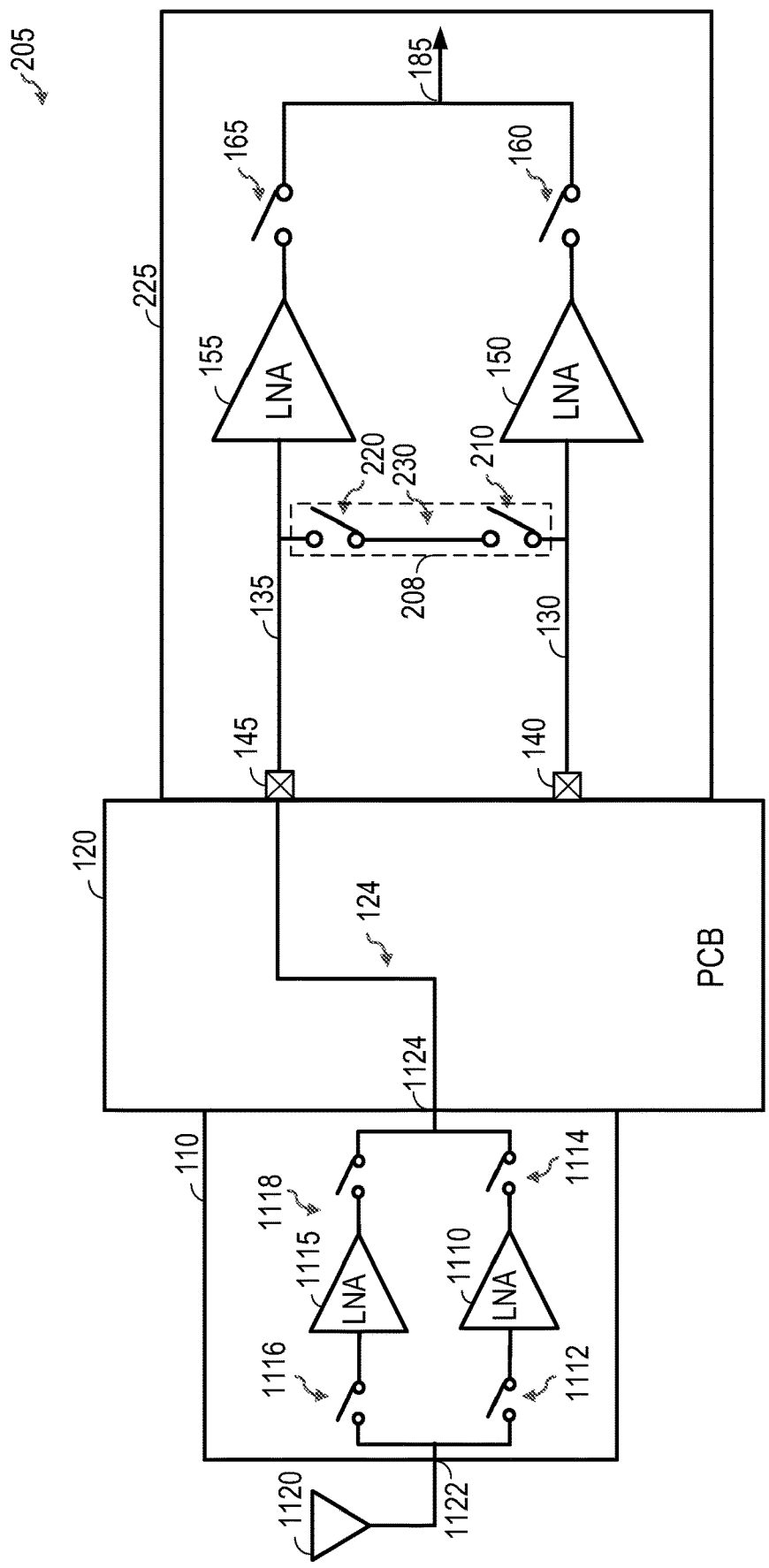
FIG. 11B shows an example of an RF front-end module including one or more LNAs in a second routing option according to certain aspects of the present disclosure.

FIG. 11A shows an example of the first routing option in which module output 1124 of the RF front-end module 110 is coupled to port 140 of the chip 225 via route 122. FIG. 11B shows an example of the second routing option in which module output 1124 of the RF front-end module 110 is coupled to port 145 of the chip 225 via route 124. For the example of the third routing option (not shown), port 140 may be coupled to the output of LNA 1110 via route 122 and port 145 may be coupled to the output of LNA 1115 via route 124.

Figure 12:
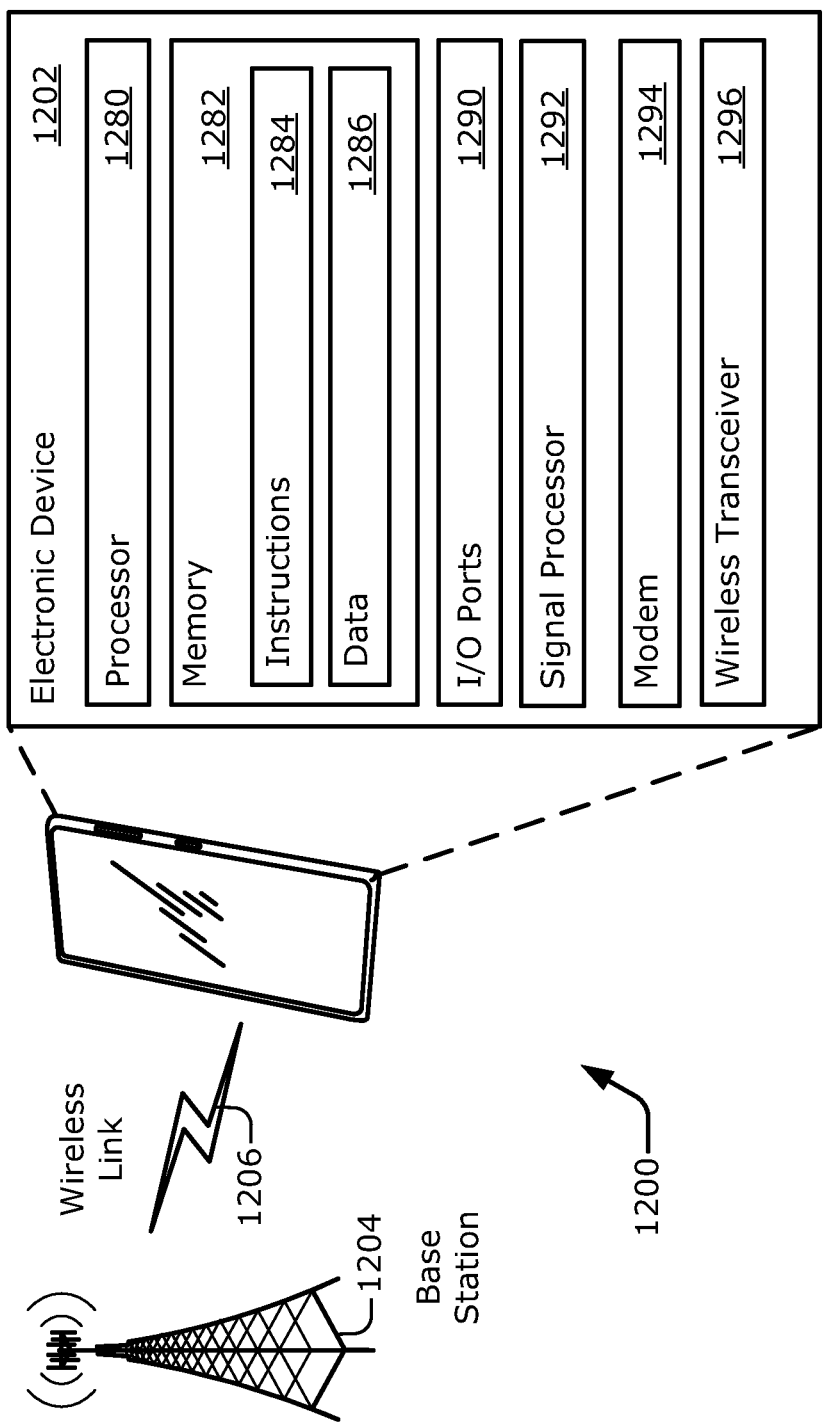
FIG. 12 is a diagram of an environment that includes an electronic device that includes a transceiver according to certain aspects of the present disclosure.

FIG. 12 is a diagram of an environment 1200 that includes an electronic device 1202 that includes a wireless transceiver 1296. The transceiver 1296 may include any one of the receivers shown in FIGS. 2A, 2B, 2C, 3, 8, 9, 10, 11A and 11B. In the environment 1200, the electronic device 1202 communicates with a base station 1204 through a wireless link 1206. As shown, the electronic device 1202 is depicted as a smart phone. However, the electronic device 1202 may be implemented as any suitable computing or other electronic device, such as a cellular base station, broadband router, access point, cellular or mobile phone, gaming device, navigation device, media device, laptop computer, desktop computer, tablet computer, server computer, network-attached storage (NAS) device, smart appliance, vehicle-based communication system, Internet of Things (IoT) device, sensor or security device, asset tracker, and so forth.

The base station 1204 communicates with the electronic device 1202 via the wireless link 1206, which may be implemented as any suitable type of wireless link Although depicted as a base station tower of a cellular radio network, the base station 1204 may represent or be implemented as another device, such as a satellite, terrestrial broadcast tower, access point, peer to peer device, mesh network node, fiber optic line, another electronic device generally as described above, and so forth. Hence, the electronic device 1202 may communicate with the base station 1204 or another device via a wired connection, a wireless connection, or a combination thereof. The wireless link 1206 can include a downlink of data or control information communicated from the base station 1204 to the electronic device 1202 and an uplink of other data or control information communicated from the electronic device 1202 to the base station 1204. The wireless link 1206 may be implemented using any suitable communication protocol or standard, such as 3rd Generation Partnership Project Long-Term Evolution (3GPP LTE, 3GPP NR 5G), IEEE 802.11, IEEE 802.16, Bluetooth™, and so forth.

The electronic device 1202 includes a processor 1280 and a memory 1282. The memory 1282 may be or form a portion of a computer readable storage medium. The processor 1280 may include any type of processor, such as an application processor or a multi-core processor, that is configured to execute processor-executable instructions (e.g., code) stored by the memory 1282. The memory 1282 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the memory 1282 is implemented to store instructions 1284, data 1286, and other information of the electronic device 1202, and thus when configured as or part of a computer readable storage medium, the memory 1282 does not include transitory propagating signals or carrier waves.

The electronic device 1202 may also include input/output ports 1290 (I/O ports 116). The I/O ports 1290 enable data exchanges or interaction with other devices, networks, or users or between components of the device.

The electronic device 1202 may further include a signal processor (SP) 1292 (e.g., such as a digital signal processor (DSP)). The signal processor 1292 may function similar to the processor and may be capable executing instructions and/or processing information in conjunction with the memory 1282.

For communication purposes, the electronic device 1202 also includes a modem 1294, a wireless transceiver 1296, and an antenna (not shown). The wireless transceiver 1296 provides connectivity to respective networks and other electronic devices connected therewith using RF wireless signals and may include the transceiver circuit 1100 of FIG. 11. The wireless transceiver 1296 may facilitate communication over any suitable type of wireless network, such as a wireless local area network (LAN) (WLAN), a peer to peer (P2P) network, a mesh network, a cellular network, a wireless wide area network (WWAN), a navigational network (e.g., the Global Positioning System (GPS) of North America or another Global Navigation Satellite System (GNSS)), and/or a wireless personal area network (WPAN).

The controller 310 may be implemented with general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

It is to be appreciated that the present disclosure is not limited to the exemplary terminology used above to describe aspects of the present disclosure. For example, a route may also be referred to as a transmission line, or another term. In another example, a port may also be referred to as a pad, a contact pad, a metal pad, a bump pad, a pin, a connector, or another term (e.g., depending on the implementation of the port). A chip may also be referred to as a die.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "approximately", as used herein with respect to a stated value or a property, is intended to indicate being within 10% of the stated value or property.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A chip, comprising:
a first port;
a first amplifier;
a first input path coupling the first port to an input of the first amplifier;
a second port;
a second amplifier;
a second input path coupling the second port to an input of the second amplifier; and
a switchable path coupled between the first input path and the second input path.

2. The chip of claim 1, wherein each of the first port and the second port comprises a respective pad.

3. The chip of claim 1, wherein the switchable path comprises:
a first switch coupled to the first input path;
a second switch coupled to the second input path; and
a transmission line coupled between the first switch and the second switch.

4. The chip of claim 1, wherein:
the first amplifier is configured to amplify a first radio frequency (RF) signal in a first frequency band; and
the second amplifier is configured to amplify a second RF signal in a second frequency band.

5. The chip of claim 4, further comprising a controller configured to:
receive a control signal indicating one of the first and second frequency bands;
open one or more switches in the switchable path when the control signal indicates the first frequency band; and
close the one or more switches in the switchable path when the control signal indicates the second frequency band.

6. The chip of claim 4, further comprising a controller configured to:
receive a control signal indicating one of the first and second frequency bands;
open one or more switches in the switchable path when the control signal indicates the second frequency band; and
close the one or more switches in the switchable path when the control signal indicates the first frequency band.

7. The chip of claim 4, wherein the switchable path comprises:
a first switch coupled to the first input path;
a second switch coupled to the second input path; and
a transmission line coupled between the first switch and the second switch.

8. The chip of claim 7, further comprising a controller configured to:
receive a control signal indicating one of the first and second frequency bands;
open the first switch and the second switch when the control signal indicates the first frequency band; and
close the first switch and the second switch when the control signal indicates the second frequency band.

9. The chip of claim 7, further comprising a controller configured to:
receive a control signal indicating one of the first and second frequency bands;
open the first switch and the second switch when the control signal indicates the second frequency band; and
close the first switch and the second switch when the control signal indicates the first frequency band.

10. The chip of claim 1, further comprising:
a mixer;
a first switch coupled between an output of the first amplifier and the mixer; and
a second switch coupled between an output of the second amplifier and the mixer.

11. The chip of claim 10, further comprising a filter coupled to the mixer.

12. The chip of claim 11, further comprising a baseband processor coupled to the filter.

13. The chip of claim 1, wherein the first port is coupled to an output of a front-end radio frequency (RF) module, the front-end RF module including at least one amplifier coupled to the output of the front-end RF module.

14. An apparatus, comprising:
a chip, wherein the chip comprises:
a first port;
a first amplifier;
a first input path coupling the first port to an input of the first amplifier;
a second port;
a second amplifier;
a second input path coupling the second port to an input of the second amplifier; and
a switchable path coupled between the first input path and the second input path;
a front-end radio frequency (RF) module;

a substrate; and a route on the substrate coupling the front-end RF module to the first port.

15. The apparatus of claim 14, wherein each of the first port and the second port comprises a respective pad.

16. The apparatus of claim 14, wherein the second port is not coupled to a route on the substrate.

17. The apparatus of claim 14, wherein the substrate comprises a printed circuit board.

18. The apparatus of claim 14, wherein the switchable path comprises:

a first switch coupled to the first input path;

a second switch coupled to the second input path; and a transmission line coupled between the first switch and the second switch.

19. The apparatus of claim 14, wherein:

the first amplifier is configured to amplify a first radio frequency (RF) signal in a first frequency band; and the second amplifier is configured to amplify a second RF signal in a second frequency band.

20. The apparatus of claim 19, further comprising a controller configured to:

receive a control signal indicating one of the first and second frequency bands;

open one or more switches in the switchable path when the control signal indicates the first frequency band; and close the one or more switches in the switchable path when the control signal indicates the second frequency band.

21. The apparatus of claim 19, wherein the switchable path comprises:

a first switch coupled to the first input path;

a second switch coupled to the second input path; and a transmission line coupled between the first switch and the second switch.

22. The apparatus of claim 21, further comprising a controller configured to:

receive a control signal indicating one of the first and second frequency bands;

open the first switch and the second switch when the control signal indicates the first frequency band; and close the first switch and the second switch when the control signal indicates the second frequency band.

23. The apparatus of claim 14, wherein the front-end RF module comprises at least one amplifier coupled between a module input and a module output, wherein the module output is coupled to the route on the substrate.

24. The apparatus of claim 23, further comprising an antenna coupled to the module input.

25. The apparatus of claim 14, wherein the chip further comprises:

a mixer;

a first switch coupled between an output of the first amplifier and the mixer; and a second switch coupled between an output of the second amplifier and the mixer.

26. A method for signal routing in a chip, the chip comprising a first port, a first amplifier, a first input path coupling the first port to an input of the first amplifier, a second port, a second amplifier, and a second input path coupling the second port to an input of the second amplifier, the method comprising:

receiving a first radio frequency (RF) signal via the first port;

inputting the first RF signal to the input of the first amplifier via the first input path;

receiving a second RF signal via the first port;

routing the second RF signal from the first input path to the second input path; and inputting the second RF signal to the input of the second amplifier via the second input path.

27. The method of claim 26, wherein:

the chip further comprises a switchable path coupled between the first input path and the second input path; and routing the second RF signal from the first input path to the second input path comprising closing one or more switches in the switchable path.

28. The method of claim 27, wherein inputting the first RF signal to the input of the first amplifier comprises opening the one or more switches in the switchable path.

29. The method of claim 26, wherein each of the first port and the second port comprises a respective pad.

30. The method of claim 26, wherein the first RF signal is in a first frequency band, and the second RF signal is in a second frequency band.

* * * * *